Patented July 30, 1935

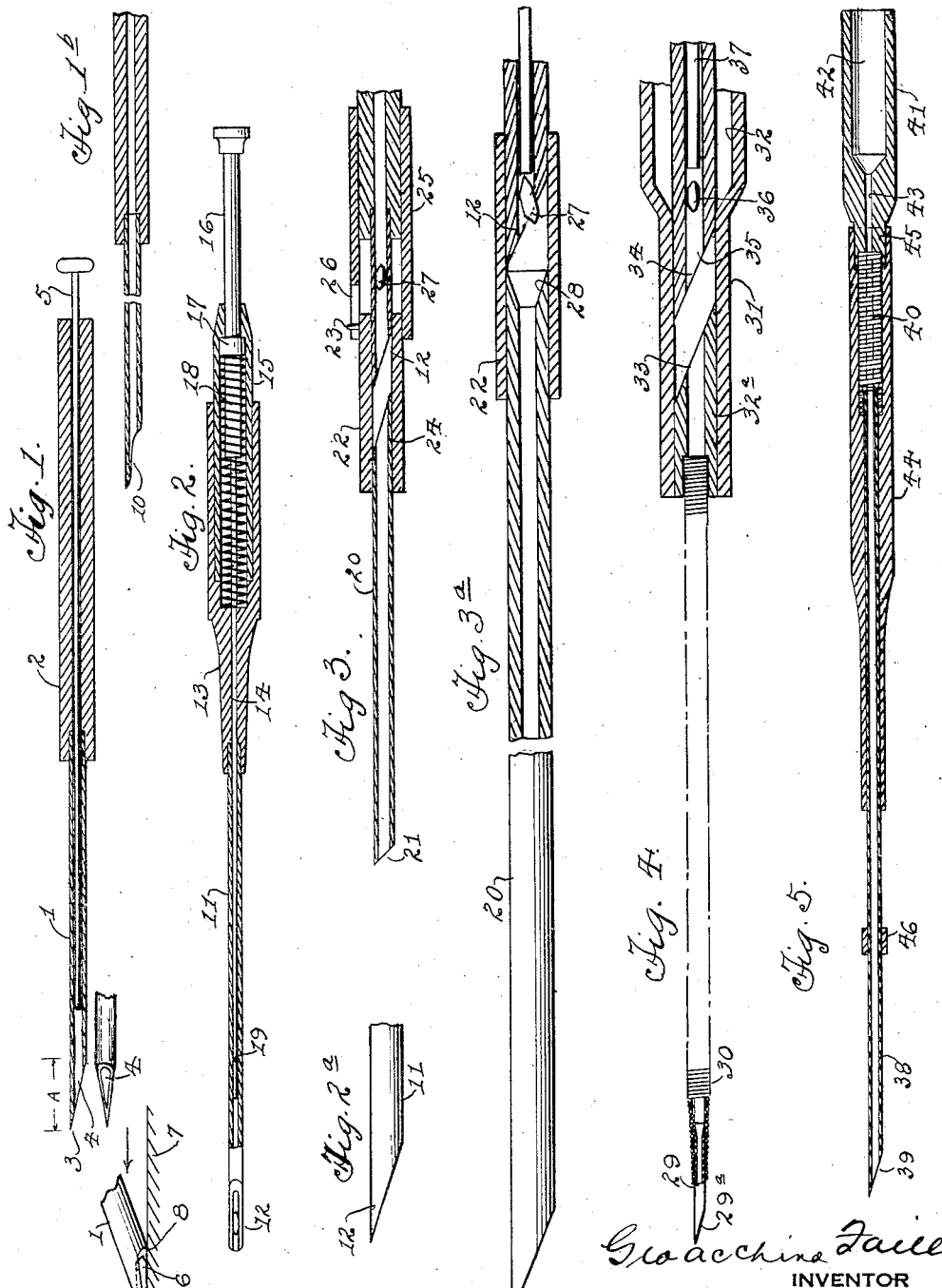

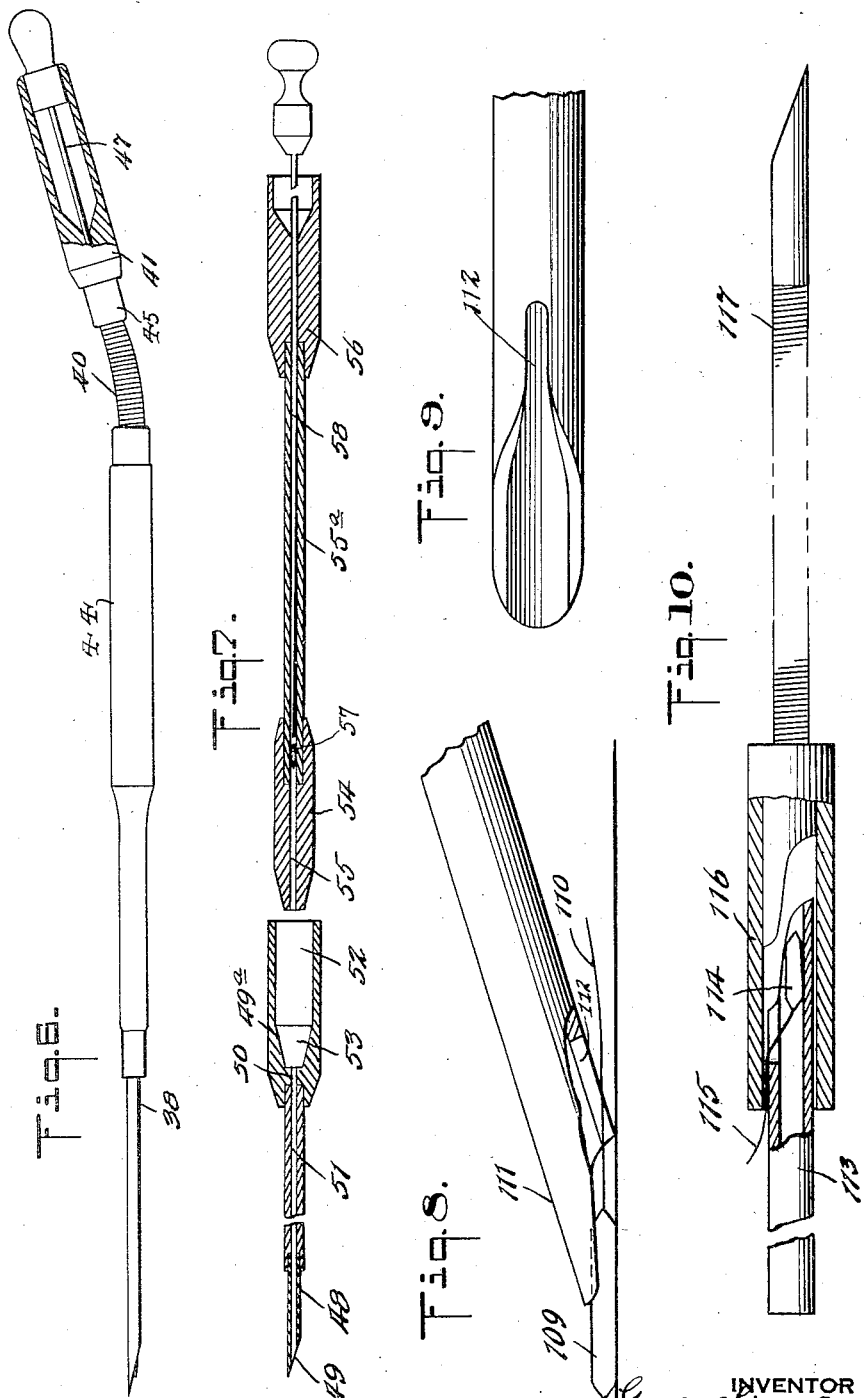

2,009,393

UNITED STATES PATENT OFFICE 2,009,393

MEANS FOR EFFECTING THERAPEUTIC IMPLANTATIONS

Gioacchino Failla, New York, N. Y.

Application June 12, 1930, Serial No. 460,593

8 Claims. (Cl. 128—217)

This invention relates to therapeutic apparatus and methods, and with particularity to methods and means for enabling seeds, capsules or other implantations to be accurately and expeditiously implanted in body tissue.

In the art of radium therapy and more particularly in that branch of the art wherein therapeutic treatments are effected by the burying or implanting of so-called radon seeds within the tissue to be treated, various methods of technique have heretofore been employed in handling, loading and inserting the seeds. The usual method of implanting a radon seed is to insert such a seed in the lumen of an inserting needle. In the case of radium emanation seeds it is obvious that the seeds cannot be handled and inserted directly by the fingers because of the danger to the operator.

Consequently the usual practice in this respect is to employ a pair of forceps to grip the seed and deposit it in the open end of the lumen. This procedure has certain disadvantages, not the least of which is that the operator very frequently has difficulty in properly inserting the seed within the bore of the needle. As an alternative to this method it has been proposed to employ a so-called loading slot intermediate the ends of the needle and to deposit the seeds in this slot. Because of the cup-shaped character of the slot the seeds upon being deposited therein align themselves with the bore of the needle and are thus prevented from being improperly positioned within the needle. In accordance with the present invention there is provided a method of loading or positioning radon seeds within a hollow implanting needle without using forceps to pick up the seeds, and without using so-called loading slots intermediate the ends of the needle.

Another object of the invention is to provide a novel technique or method and means for picking up radon seeds and discharging them within the lumen of an implanting needle.

Another object of the invention is to provide a novel form of pick up or loading device for discharging radon seeds into an implanting needle.

Another object of the invention is to provide a standard needle or trocar with a novel form of point whereby seeds or pellets may be passed into the needle bore without using forceps or the like. As a result of this method of loading the operator is enabled to load the needle using only one hand, the other hand being left free for other manipulations.

Another object of the invention relates to a combined magazine and inserter for radon implantation seeds.

Another object relates to a magazine for holding radon seeds which magazine is removably attached to an inserting needle to form in effect an extension thereof with the bore of the magazine aligned with the bore of the needle.

Ancillary to the latter object is the further object of providing a hollow implanting needle having associated therewith a removable loading magazine and a stylus or obturator having a length substantially equal to the overall length of the combined needle and magazine whereby upon complete insertion of the obturator a seed is accurately ejected from the needle.

A further object of the invention is to provide a hollow implanting needle having a rigid hollow portion and a flexible hollow portion integrally attached thereto, said flexible portion being provided with an aligned loading member. As a result of this combined rigid and flexible needle the flexible portion carrying the loading slot may be bent out of alignment with the rigid portion of the needle, thus enabling the needle to be loaded at any desired angle without interfering with the proper locating of the rigid portion of the needle within the body tissue.

As a result of this feature the needle may be loaded by an attendant from the side while the operator is enabled to view the needle in the proper manner to accurately locate it within the tissue. In other words the needle may be loaded with the seeds in substantially any position in which it is inserted in the body tissue. For example, the needle may be inserted in a vertical upward direction within the body and the flexible portion of the needle may be bent around to a nearly horizontal position to permit the loading of the needle and then the obturator inserted to prevent dislodgment of the seed within the needle. In the ordinary entirely rigid needle considerable difficulty is encountered in endeavoring to load a needle which has been thus inserted upwardly in a vertical direction because of the tendency of the seed to fall from the needle by gravity.

Another object of the invention is to provide an implanting needle having a rigid portion and a flexible portion together with means whereby the needle may be made substantially rigid throughout its entire length or rigid and flexible throughout a portion of its length.

A further object of the invention is to provide an implanting needle for use in connection with cystoscopes or the like, said needle being flexible throughout substantially its entire length provided with a trocar point and loading slot at the end opposite to the trocar in combination with a novel type of obturator having varying degrees of flexibility throughout its length.

A feature of the invention relates to the combination of a standard implanting needle or trocar and a novel form of pick-up and loading device for said needle, said device being provided with means for accurately registering the discharge end of the pick-up device with the loading end of the trocar to insure the proper passage of a radon seed or similar member from the loader to the trocar.

A further feature of the invention relates to a radon implanting needle having a reciprocating magazine intermediate the ends of the needle, which magazine is adapted to contain a plurality of radon seeds, the seeds being successively brought into registry with the bore of the implanting portion of the needle proper.

Other features and advantages not specifically enumerated will be apparent after a consideration of the following detail descriptions and the appended claims.

Referring to the drawings—

Fig. 1 shows a known form of implanting needle having a novel point according to the invention;

Fig. 1a schematically shows the method of loading the needle of Fig. 1;

Fig. 1b illustrates an implanting needle having a modified tapered end for enabling the needle to be loaded without using forceps or the like;

Fig. 2 illustrates a device for picking up and loading implanting needles of any known type;

Fig. 2a is another view of the novel point of the device shown in Fig. 2;

Fig. 3 illustrates how the pick-up device of Figs. 2 and 2a is employed to load an implanting needle; this figure also illustrates the means for properly aligning the pick-up device with the implanting needle proper;

Fig. 3a illustrates a modified construction of an implanting needle that may be used with the pick-up device of Fig. 2;

Fig. 4 illustrates a flexible implanting needle for use with cystoscopes or the like and embodying features of the invention;

Figs. 5 and 6 illustrate an implanting needle having the main portion thereof rigid and provided with a loading funnel which is pivotally or flexibly united to the needle portion; the needle of Figs. 5 and 6 may be loaded in a novel manner constituting one of the features of the invention, or may be loaded in any manner known to the art;

Fig. 7 illustrates a removable loading and guiding member to facilitate loading of known implanting needles; by means of this loading device a plurality of radon seeds may be discharged into the body without disturbing the position of the trocar or implanting needle proper.

Figs. 8 and 9 illustrate a modified form of pick-up device for radon seeds with removable filaments attached thereto; and Fig. 10 shows the pick-up device of Fig. 8 in position within the loading funnel of an implanting needle such as that shown in Fig. 4.

Referring more particularly to Fig. 1 there is shown schematically a known type of implanting needle comprising a trocar portion 1 having a reenforced barrel portion 2 integrally united therewith in any suitable manner. The left hand end of the portion 1 is provided with a novel form of point according to the invention. The design of this point is determined by the size and character of the seeds or other implantations that are to be inserted within the body tissue. In the case of radon seeds the length A of the point is preferably somewhat larger than the overall length of the seed as illustrated more clearly in Fig. 1a. Instead of being cut obliquely at a large angle, as is the usual practice with ordinary trocars or implanters, the trocar 1 is cut to provide a very long tapering portion 3 and a portion 4 adapted to completely surround the seed as shown in Fig. 1a when the trocar is being loaded. The needle is provided with any known form of obturator 5 for the purpose of discharging the seed from the bore of the needle, in accordance with the usual practice.

As a result of the elongated tapered end of the trocar 1, the trocar may be loaded with seeds simply by positioning it over the seed. Thus as shown in Fig. 1a, the seed 6 rests on any suitable rigid support 7 such as a table, a glass or the like, and the trocar 1 of the implanting needle is positioned so that the open tapered end partially surrounds the seed. In this position the edge 8 of the needle rests upon the support 7. Upon moving the needle towards the left the seed 6 is forced into the bore of the needle where it remains until ejected by means of the obturator 5. As a result of this method the operator does not have to contact directly with the seed 6 and the dangers inherent to this physical contact are thus eliminated. Furthermore, the needle or trocar 1 may be accurately and expeditiously loaded by using only one hand. This method also avoids the use of forceps or similar devices for gripping the seeds and depositing them within the trocar, thus preventing deformation of the seed when gold walled or similar seeds are employed. The manner of using the loaded needle is so well known in the art that further description thereof is not believed necessary at this point. Suffice it to say that with the method of loading above described the seed enters entirely within the bore of the needle and leaves the portion 3 free from perforating the body tissue. If very small seeds are to be loaded into the needle then they may be retained in the point by using vaseline or wax to prevent their dislodgement.

The needles shown in Fig. 1 are preferably formed by cutting the trocar portion 10 obliquely at a very sharp angle of the order of 20 degrees so that when the needle is positioned as shown in Fig. 1a the needle is almost parallel to the support 7.

Fig. 1b shows a modified form of needle adapted to pick-up or load from the discharge end, wherein the needle end is formed with a rounded point 10 formed by a reversely-curved oblique cut.

Referring to Fig. 2 a description will now be given of a novel type of pick-up device according to the invention. In this figure the device is in general similar to an implanting needle and comprises a trocar-like portion 11 having a discharge opening at the left hand end which end is preferably provided with a relatively long tapered point 12, preferably of the order of 20 degrees so that when the portion 11 is positioned with its point over the seed and the trocar moved toward the left the seed enters the bore of the trocar as described in connection with Fig. 1a.

Since the device of Fig. 2 is intended to be used solely as a pick-up device, it is preferable to round off the end 12 so as to expedite the picking up operations.

Rigidly united to the right hand end of the portion 11 is a barrel member 13 having a bore 14 registering with the bore of the portion 11. Positioned within the open right hand end of member 13 is a sleeve member 15 through which passes the ejecting plunger 16. Plunger 16 carries a stop lug 17, and positioned between the lug 17 and the bottom of the opening in member 13 is a spring 18 whereby the plunger is normally maintained in its outermost position as shown in Fig. 2. An obturator 19 is attached to the end of the plunger 16. Consequently when the seed is loaded in the open end of the member 11 as hereinabove described, it may be transported to the loading ends of the needles, such for example as shown in Figs. 5, 6 and 7, or any prior art form of needle whereupon the plunger 16 may be depressed to eject the transported seed into the bore of the needle.

In this connection it may be noted that the external diameter of the portion 11 is preferably of the same order as the bore of the needle barrel to receive the seeds so that the point 12 of the pick-up device may partially enter the needle barrel. Thus the seed is accurately aligned with the needle bore and the needle may be loaded without any physical contact therewith. This method of picking up and discharging the seed into the receiving end of the needle possesses advantages over the ordinary method of using forceps since it is very difficult in using forceps to accurately align the seed with the needle bore. Furthermore, in the case of delicate seeds such as those employing soft gold or soft metal walls the act of picking up the seeds between the jaws of the forceps may tend to deform the seed ends.

Referring to Fig. 3 there is shown a modified form of implanting needle of known type together with the manner of using the pick-up device of Fig. 2 for loading the needle. In Fig. 3 the needle proper comprises a trocar portion 20 having the blunt tapered point 21. Soldered or otherwise fastened to the trocar 20 is a heavier barrel member 22 which carries a pin 23. It will be noted that the right hand end of the trocar 20 is cut to a shape substantially similar to that shown for the end of the pick-up device (Fig. 2a). This pick-up device is preferably of the same construction as that disclosed in Figs. 2 and 2a and similar parts of the pick-up device bear the same designation numerals in Fig. 3 as are used in connection with Figs. 2 and 2a. Inasmuch as the discharge point 12 of the pick-up device is preferably brought into abutment with the end 24 of the trocar it is also preferable to provide the portion 13 of the pick-up device with a sleeve 25 having a slot 26 in the end thereof, which slot is adapted to register with the pin 23. When this registry is effected the point 12 of the pick-up device is in the proper relation with the end 24 of the trocar so that the trocar 20 and the portion 11 of the pick-up device form in effect a single continuous tube, as a result of which the seed 27 may be ejected from the pick-up device into the trocar 20 without danger of the seed becoming stuck within the needle. Instead of providing the inner end of the trocar 20 with a taper as shown in Fig. 3, the inner end of the trocar may be counter-sunk as indicated by the numeral 28 of Fig. 3a. By means of this countersunk end when the seed 27 is ejected from the point 12 of the pick-up device it is aligned with the bore of the trocar.

Referring to Fig. 4 there is shown an implanting needle suitable for use with cystoscopes or similar instruments embodying features of the invention. In this embodiment the trocar portion 29 is relatively short and provided with a tapered discharge opening 29ᵃ. The greater part of the needle is in the form of a closely wound wire helix 30 which has attached to its right hand end a loading member 31 provided with a funnel opening 32. Soldered to the right hand end of the flexible needle 30 and positioned within the member 31 is another member 32ᵃ having a tapered end 33 preferably similar in shape to the end 24 described in connection with Fig. 3. The numeral 34 represents the discharge end of a pick-up and loading device similar to that shown in Fig. 2 having a tapered discharge point 35 complementary to the end 33 of the member 32 so that the pick-up device and the member 32 form in effect a single continuous channel for the passage of the seed 36 therethrough. Any suitable type of obturator 37 may be employed for forcing the seed 36 from the pick-up device through the flexible needle 30 and thence into the body tissue.

While the above is the preferred manner of loading the needle of Fig. 4, it will be understood that the needle may be loaded in any other manner known to the prior art. Similarly, the point of the needle may be shaped similar to the point of the nedle shown in Fig. 1b in which case the method of picking up described in connection with Fig. 1 may also be employed.

Referring to Fig. 5 there is shown a modified form of needle comprising a trocar portion 38 having a tapered discharge opening 39 at one end. Integrally united to the other end of the trocar is a flexible portion 40 in the form of a closely wound wire helix having an internal diameter substantially the same as the diameter of the trocar 38. Attached to the end of flexible portion 40 is a loading member or funnel 41, this member having an opening 42 of larger diameter to facilitate loading, and a bore 43 of reduced diameter registering with the bores of the portions 38 and 40. Slidably mounted on the trocar 38 is a metal sleeve 44 which has its right hand end recessed to correspond with the reduced portion 45 of the member 41. A stop member 46 is rigidly fastened to the trocar 38 and serves to limit the movement of the sleeve 44 towards the left, as indicated in Fig. 6. In this position of the sleeve 44 it will be noted that the flexible portion 40 protrudes beyond the right hand end of the sleeve and thus the loading member 41 may be bent to any desired position. Thus if the trocar 38 is to be inserted upwardly in a substantially vertical direction the member 41 may be moved to a horizontal position and seeds loaded therein in the manner hereinabove described, after which the obturator 47 may be passed through the needle to prevent the dislodgment of the seed. It will be understood of course that the obturator 47 itself is flexible in order that it may adapt itself to the contour of the flexible portion 40. After the seed has been pushed into the trocar portion 38, the sleeve 44 may be moved toward the right to the position indicated in Fig. 6, whereupon the entire assembly becomes a rigid one and the obturator may be inserted up to the hilt to discharge the seed from the open end of the trocar. The foregoing arrangement is particularly useful where it is difficult to load seeds directly into a needle since the flexible portion of the needle may be bent to any convenient angle so as to facilitate the loading and to prevent the seed from accidently falling out due to gravity. Furthermore, by means of this arrangement the trocar 38 or needle proper may be accurately inserted in the body tissue at the proper angle after which the resilient portion may be bent at any other desired angle to facilitate the insertion of the seeds.

It should be noted that with the needle of Figs. 5 and 6 no special device is necessary for loading. A seed may be dropped into the funnel shaped member at the right hand end in any convenient manner, e. g. by means of forceps. Since, by virtue of the flexible portion 40, this end can be held in an oblique position, and on account of the long tapered shape of the bore 42, the seed will tend to fall by gravity into the bore 43. The point of the obturator will then push it down into the trocar portion.

Referring to Fig. 7 there is shown another method of loading an implanting needle. In this figure the implanting needle proper comprises a trocar portion 48 having a point 49 similar to that ordinarily employed in needles of this type. Attached to the right hand end of the trocar 48 is a barrel member 49ᵃ having a bore 50 of the same size as the bore 51 of the trocar. The barrel 49ᵃ is also provided with an enlarged bore 52 terminating in a tapered portion 53. The portions 52 and 53 are adapted to receive a correspondingly shaped member 54 having a bore 55 of the same size as the bore 50. Soldered to the member 54 is a long narrow tubular portion 55ᵃ which may be either rigid throughout its length, or may be partly rigid and partly flexible similar to the portions 38 and 40 of Fig. 5. Member 55ᵃ has soldered to its right hand end a loading member or funnel 56 in which the seeds are adapted to be deposited in any convenient manner. The member 55 forms in effect therefore what may be termed a separable loading magazine for the needle 48. In other words the needle may be first inserted at the proper position and at the proper angle in the body tissue, whereupon the member 55 which has been previously loaded with a seed or seeds 57 is inserted in the open end 52 of the needle and an obturator 58 is then passed through the members 55 and 48 to discharge the seed in the body tissue. Following this method therefore the needle 48 may be left in the body tissue while the member 55 may be removed and loaded with another seed, thus doing away with the necessity of repeatedly implanting the needle in the body for the implanting of successive seeds.

In certain cases it may be found necessary to employ radon seeds having a removing filament. Thus as shown in Fig. 8 the seed 109 may be of the type disclosed in copending application Serial No. 341,211 having a flexible wire or thread 110 attached thereto. In order to employ the method of picking up or loading as described in connection with Figs. 1, 2 and 3, the point 111 (shaped similar to the points of Figs. 1, 2 and 3) of the needle or pick-up device is provided with a slot 112 to receive the filament 110. The manner of loading the seed 109 into the needle is substantially the same as that described in connection with Figs. 1 and 1a, the operator holding the thread or filament 110 with one hand, the point of the needle being positioned over the seed 109 and moved toward the left whereby the seed is forced into the needle bore.

If it is desired to load a needle such as that of Fig. 4 with a seed having a removing filament, it is necessary to provide the loading funnel with a slightly larger internal diameter than the diameter of the pick-up device. Thus there is shown in Fig. 10 a pick-up point 113 associated with a pick-up device similar to that of Fig. 2, point 113 being provided with a slot similar to slot 112 of Fig. 9. A seed 114 having a removing filament 115 is shown as having been loaded into the pick-up point 113 as hereinabove described. The external diameter of the point 113 being slightly less than the internal diameter of the loading funnel 116 so that there is no binding between the filament 115 and the interior face of the funnel member 116. The method of discharging the seed from the pick-up point 113 into and through the needle 117 is similar to that already described.

While specific forms of apparatus have hereinbefore been described, it will be understood that the invention is not limited thereto. For example, in connection with Fig. 6, while the needle proper is provided with a flexible portion for enabling the seeds to be dropped into the loading member 41, at any desired angle, it will be understood that the needle may be made in two rigid portions which are united by means of a swivel or hinged joint whereby a loading member may be rotated out of alignment with the needle proper.

Other changes and modifications will be apparent to those familiar with the art.

What is claimed is:

1. Means for manipulating radon seeds comprising a hollow tubular member for implanting a seed in body tissue, said member having a sharp point at one end and being obliquely cut at the opposite end, a member for loading said implanting member comprising a hollow tubular member having an obliquely cut end adapted to pick-up a radon seed, the shape of the obliquely cut end of the pick-up member being complementary to the obliquely cut end of the implanting member, said loading member being removably united to said implanting member with the bores thereof in alignment.

2. Means according to claim 1 in which the implanting member and the pick-up member are provided with cooperating means for insuring proper registry between the respective obliquely cut ends.

3. In combination a trocar seed implanter, a seed carrier adapted to be fitted to the loading end of said implanter, means adapted to be fitted to the carrier for picking up a seed and injecting it into said carrier, the last mentioned means including a tube with a trocar-like point having a rounded tip and an obturator movable through the bore of said trocar-like member and into the bore of said implanter.

4. An implanting needle comprising a rigid trocar portion, a long flexible body portion, a loading tube attached to said flexible portion, the bore of said tube being provided with a reversely curved end to receive a corresponding end of a trocar-like loading member.

5. An implanting needle comprising a rigid trocar portion, a rigid loading portion, a flexible portion between said rigid portions, all said portions having a single continuous bore through which a seed is adapted to be passed, and a movable member for coupling the trocar portion and loading portion to maintain all three portions in rigid alignment.

6. An implanting needle comprising a rigid trocar portion, a rigid loading portion, a flexible portion between said rigid portions, all said portions forming a single continuous bore for the passage of a seed, and a slidable sleeve adapted to surround said flexible portion to maintain all the portions in rigid alignment.

7. A device for picking up radon seeds comprising a hollow tubular member having an end obliquely cut at a sharp angle and a slit in the wall of said tube for receiving a removing filament attached to the radon seed.

8. In combination a trocar seed implanter having a trocar point at one end, the opposite end being cut obliquely, a sleeve surrounding said obliquely cut end and a needle loading device adapted to fit within said sleeve, said loading device having a tapered end corresponding to said obliquely cut end to form in effect a single continuous bore between the seed loader and the trocar.

GIOACCHINO FAILLA.